Nov. 26, 1946.    H. O. KLINKE    2,411,737
METHOD AND APPARATUS FOR CONTROLLING TORCH SPACING
Filed Feb. 7, 1946    2 Sheets-Sheet 1

INVENTOR
HENRY O. KLINKE
BY
ATTORNEYS

Nov. 26, 1946.  H. O. KLINKE  2,411,737
METHOD AND APPARATUS FOR CONTROLLING TORCH SPACING
Filed Feb. 7, 1946   2 Sheets-Sheet 2

INVENTOR
HENRY O. KLINKE
BY
ATTORNEYS

Patented Nov. 26, 1946

2,411,737

UNITED STATES PATENT OFFICE 2,411,737

METHOD AND APPARATUS FOR CONTROLLING TORCH SPACING

Henry O. Klinke, Forest Hills, N. Y., assignor to Air Reduction Company, Incorporated, a corporation of New York Application February 7, 1946, Serial No. 646,079

8 Claims. (Cl. 266—23)

This invention relates to a method and apparatus for controlling the spacing between the tip of a gas torch and the surface of a work-piece that is being cut, welded, or otherwise treated by the torch.

In mechanical cutting, welding, or heat-treating apparatus it is desirable to maintain the tip of the gas torch a uniform distance from the work surface, and it is the principal object of this invention to provide a method and apparatus by which this is automatically accomplished.

In the preferred form of the apparatus a liquid jet-producing device attached to the torch or its tip delivers a fine jet of a conductive liquid, such as salt water, angularly toward the work surface and toward the flame jet of the torch so that the liquid jet strikes the work surface short of the flame jet when the spacing of the torch tip from the surface is relatively small but is intercepted by the flame jet and interrupted by vaporization of the portion of the jet in contact with the flame if the spacing is relatively great. The liquid jet is connected in an electric circuit which includes the work-piece, and the completion of the electric circuit by contact of the liquid jet with the work surface and the breaking of the electric circuit by interruption of the liquid jet are utilized to control an electric motor which moves the torch up or down to substantially preserve the desired spacing between the torch tip and the work surface.

Figure 1:
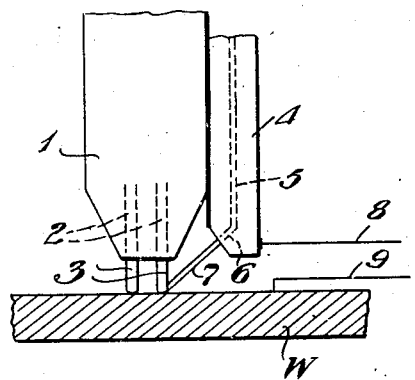
Figure 2:
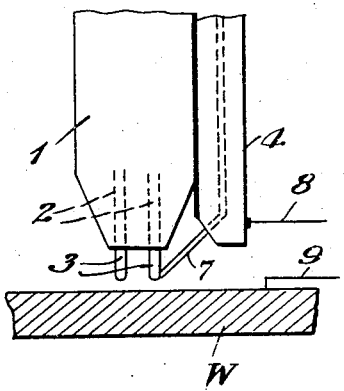
Figure 3:
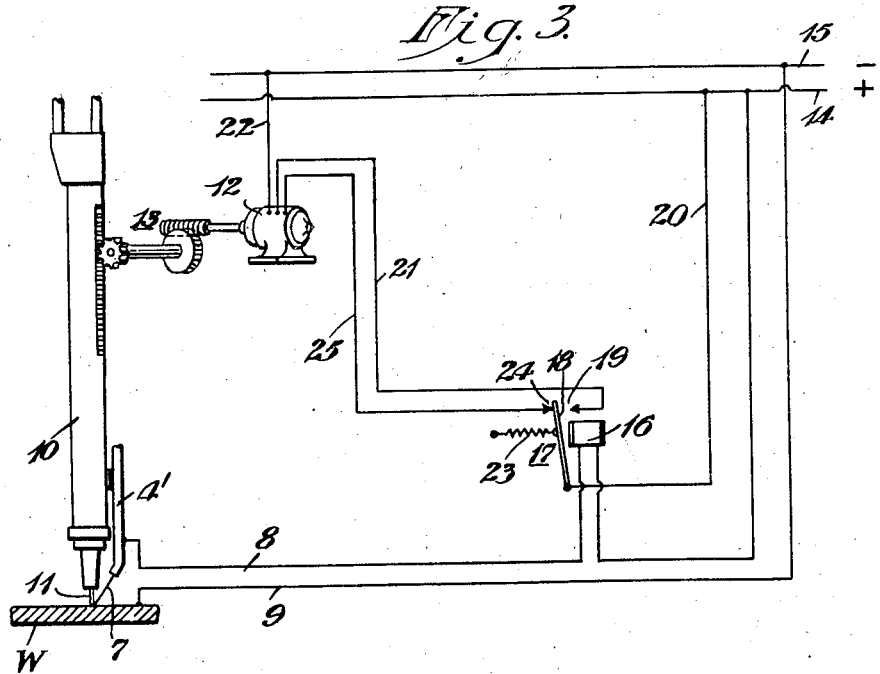
Figure 4:
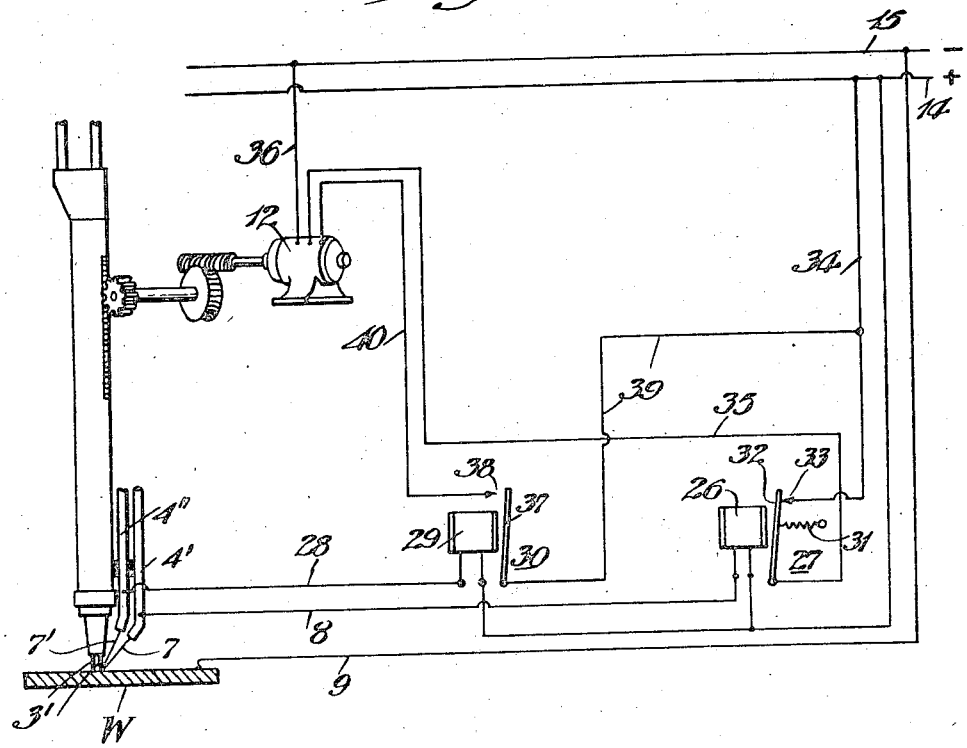

Several forms of apparatus embodying the invention and that are adapted for use in carrying out the method are illustrated more or less diagrammatically in the accompanying drawings, in which Figure 1 is a side elevation of the lower end of the tip of a heating or welding torch provided with liquid jet-producing means, this view showing how the jet of conductive liquid strikes the work surface when the spacing of the torch tip from it is relatively small and how the electric circuit which includes the liquid jet is completed under these circumstances;

Fig. 2 is a view similar to Figure 1 showing how the flame-contacting portion of the liquid jet is vaporized and the jet interrupted when the spacing of the torch tip from the work surface is relatively great and how the electric circuit is broken under these circumstances;

Fig. 3 is a diagrammatic representation of one form of control mechanism for moving the torch up and down as the electric circuit is completed and broken by contact of the liquid jet with the work surface and by its interruption by the flame jet of the torch; and Fig. 4 is a view similar to Fig. 3 showing a modified form of torch control mechanism in which the up and down movement of the torch by the motor depends upon the completion and breaking of electric circuits through two liquid jets instead of one.

Referring first to Figs. 1 and 2, the lower end of the tip of a gas torch is represented at 1. In these figures the tip is shown as a heating or welding tip of the block type having the usual jet passages 2 for the gas mixture which feeds the preheating flame jets 3. Attached to the torch or torch tip there is a liquid jet-producing device such as a copper bar or tube 4 having a liquid passage 5 therein with a discharge portion 6 adapted to project a fine jet of liquid 7 angularly toward the surface of the work-piece W and toward the ends of the flame jets. The liquid may be any suitable liquid that will conduct electricity and that is capable of being vaporized when the liquid jet comes in contact with the flame jet, such as salt water or water containing an acid. Preferably, salt water is used for the purpose as this can be readily and economically produced by passing tap water through a receptacle containing salt. A pair of electric conductors 8 and 9 are connected, respectively, to the liquid jet-producing device 5 and the work-piece W.

It will be seen from Fig. 1 that when the torch tip is close enough to the work surface for the liquid jet 7 to strike the surface an electric circuit may be completed through the liquid jet, the jet serving as a conductor to conduct the current between the work-piece and the jet-producing device. When the spacing between the torch tip and the work-piece is greater than shown in Fig. 1, the liquid jet 7 is intercepted by one of the preheating flame jets and the flame-contacting portion of the jet is vaporized and the jet thus interrupted as shown in Fig. 2. Under these circumstances the electric circuit, of which the liquid jet forms a part, is broken.

The completion and breaking of the electric circuit through the liquid jet, as above described, is utilized to control movement of the torch to substantially preserve the desired normal spacing of the torch tip from the work surface. One form of control mechanism for this purpose is diagrammatically illustrated in Fig. 3. In this figure the torch 10 is shown as a welding torch adapted to produce a heating flame jet 11. The torch carries a liquid jet-producing device 4' of any kind that is suitable for use with the type of torch shown, such as a copper tube. The torch and the liquid jet-producing device are movable up and down by a reversible electric motor 12 through the gearing represented at 13. The previously described conductors 8 and 9 connected, respectively, to the liquid jet-producing device and the work-piece, are supplied with current from a power line 14—15. The circuit, of which the conductors 8 and 9 form a part, includes the winding 16 of a relay 17. When the relay is energized the contacts 18 and 19 close to complete a circuit to the electric motor from line conductor 14 through the conductors 20, 21 and 22 to line conductor 15. This causes rotation of the motor in one direction. When the relay is not energized a spring 23 moves the contact 18 into engagement with a contact 24 to complete a circuit to the motor from line conductor 14 through the conductors 20, 25 and 22 to line conductor 15. This causes the motor to rotate in the opposite direction.

It will now be seen that if the spacing between the work-piece and the torch tip becomes sufficiently small the liquid jet 7 will strike the work surface and complete the circuit of the relay 17. This will cause the motor to rotate in a direction that will move the torch tip up. When the liquid jet is intercepted by the flame jet and is vaporized the relay circuit is broken and the motor is caused to rotate in the opposite direction to move the torch tip down. The tip will therefore alternate between a position in which the liquid jet 7 is just touching the work surface and a position in which it is not touching the surface. The relay will continually operate and the motor will continually jog the torch tip slightly up and down and maintain an average normal desired spacing of the torch tip from the work surface.

Fig. 4 diagrammatically illustrates a modified form of control mechanism in which there are two jet-producing devices 4' and 4'' which project two liquid jets 7 and 7' instead of the single liquid jet previously described. The two jets are so arranged that the jet 7' strikes the flame jet of the torch slightly higher than the point at which the liquid jet 7 strikes it. In Fig. 4 the torch is shown as a cutting torch having preheating flame jets 3'. The previously described conductors 8 and 9 which conduct current to the liquid jet 7 are part of a circuit which includes the winding 26 of a relay 27. A third conductor 28 is connected to the liquid jet-producing device 4'' and is connected through the winding 29 of a second relay 30 to the line conductor 14. It will thus be seen that the second liquid jet 7' is in an electric circuit which includes the conductors 9 and 28 and the relay 30.

The normal desired spacing between the torch tip and the work surface occurs when the liquid jet 7 is touching the work surface and the liquid jet 7' is not touching. If the spacing becomes too great and the jet 7 is not touching, the circuit of the relay 27 is broken, thus allowing the spring 31 to close the relay contacts 32 and 33 and complete a circuit to the motor 12 from line conductor 14 through the conductors 34, 35 and 36 to line conductor 15. The motor then rotates in a direction to move the torch down. If the torch tip is too close to the work surface and the liquid jet 7' is touching the surface, the winding of relay 30 is energized to close the contacts 37 and 38 and complete a circuit to the motor from line conductor 14 through conductors 34, 39, 40 and 36 to line conductor 15. This will rotate the motor in the opposite direction to move the torch up. Thus, as long as the normal desired spacing occurs between the torch tip and the work surface, i. e. when the liquid jet 7 touches the work surface, there will be no movement of the torch, but if the spacing becomes less than the normal desired spacing the motor will operate to move the torch up, and should the spacing become greater than the normal desired spacing the motor will operate to move the torch down.

In both systems above described the control mechanism may be utilized to initially create the normal desired spacing between the torch tip and the work surface, i. e. it may be utilized to bring the torch to its proper position relative to the work surface, and thereafter, during relative movement between the work-piece and the torch the desired normal spacing between the work surface and the torch tip will be maintained regardless of any unevenness in the work surface or other conditions which tend to destroy the desired normal spacing.

Instead of using a jet of conductive liquid as the substance that controls the torch-moving motor, a conductive wire may be fed angularly toward the work and toward the flame jet made of material that is capable of being melted by the flame. The wire would touch the work surface when the torch tip is relatively close to the surface and would be intercepted and interrupted by the flame jet when the torch tip is relatively far from the work surface, in the same manner as above described in connection with the liquid jet. In either case the column of conductive substance, when intercepted by the flame jet, would be interrupted because of a change in the physical state of the substance caused by the heat of the flame.

While the controlling of the current in the circuit of each liquid jet is herein referred to as completion and breaking of the circuit, it will be understood that this is intended to include not only an absolute breaking and reestablishment of the circuit but also a virtual breaking of the circuit by reduction of the current in the circuit from some relay-energizing value to some very small relay-armature releasing value by the introduction of the very high resistance in the path from the jet-producing device to the work-piece when the liquid jet is vaporized, and restoration of the current to its normal relay-energizing value when the liquid jet strikes the work surface. For instance, when the jet is in contact with the work surface a relatively high conductivity path of about 1 millimho might exist between the jet-producing device and the work, whereas when the jet is vaporized the conductivity of such path might be as low as 0.005 millimhos, the ratio of conductance being thus about 200 to 1 and the current being low enough when the jet is vaporized to cause the relay windings to release their armatures.

I claim:

1. The method of controlling the spacing of a torch tip from the surface of a work-piece which comprises feeding angularly toward the work surface and toward the flame jet of the torch a small column of conductive substance capable of having its physical state changed by contact with the flame jet so that when the spacing between the work surface and the torch tip is relatively small said column of substance will strike the work surface short of the flame jet and when such spacing is relatively great the column of substance will be intercepted by the flame jet and the portion in contact with the flame will have its physical state changed to thereby interrupt the column, passing electric current through said column of substance, and utilizing the change in value of said current produced upon interruption of the column of substance and upon its striking the work surface for moving the torch tip toward and away from the work surface.

2. The method of controlling the spacing of a torch tip from the surface of a work-piece which comprises feeding angularly toward the work surface and toward the flame jet of the torch a small column of conductive substance capable of having its physical state changed by contact with the flame jet so that when the spacing between the work surface and the torch tip is relatively small said column of substance will strike the work surface short of the flame jet and when said spacing is relatively great the column of substance will be intercepted by the flame jet and the portion in contact with the flame will have its physical state changed to thereby interrupt the column, passing electric current through a circuit which includes said column of substance and the work-piece, and utilizing the breaking and making of said circuit produced upon interruption of the column of substance and upon its striking the work surface for moving the torch tip toward and away from the work surface.

3. The method of controlling the spacing of a torch tip from the surface of a work-piece which comprises producing a jet of conductive liquid and directing it angularly toward the work surface and toward the flame jet of the torch so that when the spacing between the work surface and the torch tip is relatively small the liquid jet will strike the work surface short of the flame jet and when such spacing is relatively great the liquid jet will be intercepted by the flame jet and be interrupted by vaporization of the portion of the jet in contact with the flame, passing electric current through the liquid jet, and utilizing the change in value of said current produced upon interruption of the liquid jet and upon its striking the work surface for moving the torch tip toward and away from the work surface.

4. The method of controlling the spacing of a torch tip from the surface of a work-piece which comprises producing a jet of conductive liquid and directing it angularly toward the work surface and toward the flame jet of the torch so that when the spacing between the work surface and the torch tip is relatively small the liquid jet will strike the work surface short of the flame jet and when such spacing is relatively great the liquid jet will be intercepted by the flame jet and be interrupted by vaporization of the portion of the jet in contact with the flame, passing electric current through a circuit which includes said liquid jet and the work-piece, and utilizing the breaking and making of said circuit produced upon interruption of the liquid jet and upon its striking the work surface for moving the torch tip toward and away from the work surface.

5. Apparatus for controlling the spacing of a torch tip from the surface of a work-piece comprising means for moving the torch tip toward and away from the work surface, liquid jet-producing means movable with the tip and adapted to project a fine jet of conductive liquid at an angle toward the work surface and toward the flame jet of the torch so that when the spacing between the work surface and the torch tip is relatively small the liquid jet will strike the work surface short of the flame jet and when such spacing is relatively great the liquid jet will be intercepted by the flame jet and be interrupted by vaporization of the portion of the jet in contact with the flame, an electric circuit of which the liquid jet and the work-piece constitute a part, and means in said circuit responsive to a change in current value in the circuit produced upon interruption of the liquid jet and upon its striking the work surface for controlling said torch moving means.

6. Apparatus for controlling the spacing of a torch tip from the surface of a work-piece comprising an electric motor for moving the torch tip toward and away from the work surface, liquid jet-producing means movable with the tip and adapted to project a fine jet of conductive liquid at an angle toward the work surface and toward the flame jet of the torch so that when the spacing between the work surface and the torch tip is relatively small the liquid jet will strike the work surface short of the flame jet and when such spacing is relatively great the liquid jet will be intercepted by the flame jet and be interrupted by vaporization of the portion of the jet in contact with the flame, an electric circuit of which the liquid jet and the work-piece constitute a part, and relay means in said circuit responsive to a change in current value in the circuit produced upon interruption of the liquid jet and upon its striking the work surface for controlling said electric motor.

7. Apparatus for controlling the spacing of a torch tip from the surface of a work-piece comprising means for moving the torch tip toward and away from the work surface, liquid jet-producing means movable with the tip and adapted to project two fine jets of conductive liquid at an angle toward the work surface and toward the flame jet of the torch so that one of said jets is located higher than the other and so that when the spacing between the work surface and the torch tip is less than the desired normal both liquid jets will strike the work surface short of the flame jet and when said spacing is greater than the desired normal both liquid jets will be intercepted by the flame jet and be interrupted by vaporization of the portions of them in contact with the flame and when said spacing is at the desired normal, the upper liquid jet will be intercepted by the flame jet but the lower liquid jet will strike the work surface, an electric circuit of which the lower liquid jet and the work-piece constitute a part, a second electric circuit of which the higher liquid jet and the work-piece constitute a part, and means in said circuits responsive to a change in current value in them produced upon interruption of the liquid jets and upon their striking the work surface for controlling said torch moving means.

8. Apparatus for controlling the spacing of a torch tip from the surface of a work-piece comprising means for moving the torch tip toward and away from the work surface, liquid jet-producing means movable with the tip and adapted to project two fine jets of conductive liquid at an angle toward the work surface and toward the flame jet of the torch so that one of said jets is located higher than the other and so that when the desired normal spacing between the work surface and the torch tip exists the upper jet will be intercepted by the flame jet and be interrupted by vaporization of the flame-contacting portion of the jet while the lower jet will touch the work surface short of the flame jet and when the spacing is greater than the desired normal both liquid jets will be intercepted and interrupted by the flame jet and when the spacing is less than the desired normal both liquid jets will touch the work surface short of the flame jet, an electric circuit of which the lower liquid jet and the work-piece constitute a part, a second electric circuit of which the higher liquid jet and the work-piece constitute a part, and means in said circuits responsive to changes in current value produced in them upon interruption of the jets and upon their striking the work surface for maintaining the torch-moving means inoperative when the tip spacing is at the desired normal and the lower jet touches the work surface and for rendering the torch-moving means operative to move the torch tip toward the work surface when the tip spacing is greater than the desired normal and the lower liquid jet is interrupted by the flame jet and for rendering the torch-moving means operative to move the torch tip away from the work surface when the tip spacing is less than the desired normal and the higher liquid jet strikes the work surface.

HENRY O. KLINKE.